Jan. 29, 1963

C. D. BARLET 3,075,871

METHOD OF BONDING METAL TO GLASS

Filed April 21, 1960

INVENTOR
CLARENCE D. BARLET

ATTORNEY

United States Patent Office 3,075,871
Patented Jan. 29, 1963

3,075,871
METHOD OF BONDING METAL TO GLASS
Clarence D. Barlet, Palmyra, Pa., assignor to Armstrong Cork Company, Lancaster, Pa., a corporation of Pennsylvania
Filed Apr. 21, 1960, Ser. No. 23,694
1 Claim. (Cl. 156—322)

This invention relates to a method of bonding metal to glass and more specifically relates to a method of bonding metallic articles, such as brackets, to glass surfaces, such as the windshields of automobiles.

The use of larger and larger surface areas in the windows of modern automobiles, especially in the modern curved windshields, has resulted in problems relating to the adequate securing of metallic articles, such as rear view mirror brackets, in the proper position for optimum utilization of the mirror. Until very recent years, metallic brackets were secured directly to the metallic portions of the automobile chassis by means of screws or other mechanical fastening means and the relative positions of the metallic chassis in relationship to the windshield area allowed for the advantageous positioning of the brackets so that the mirrors which were subsequently affixed to the brackets were in a position where maximum utilization of the mirror surface was realized. However, with the modern curved windshield surface area sloping farther and farther back into the area previously occupied by the metallic shell of the automotive chassis, the positioning of the metallic bracket, by affixing with mechanical fastening means to the metallic chassis so that maximum utilization of the mirror surface can be utilized, has become more difficult. In the most recent models, it has been necessary to affix the metallic mirror bracket to the glass portion of the windshield itself in order that full utilization of the mirror can be realized. This has necessitated a metallic to glass adhesive bond rather than the use of the usual type of mechanical fastening means for securing the bracket in position.

The primary object of this invention is to provide a method whereby a strong and permanent metal to glass bond is achieved without any stress development in the glass.

An ancillary object of this invention is to provide a method of bonding metal to glass such that the bond established between the metal and glass will not be subject to deterioration under extreme temperature conditions.

These and other objects have been accomplished by providing a method of bonding the metallic bracket to the glass windshield surface such that stresses which often set up in the adhesive bonding medium while the adhesive is setting up are minimized and an optimum bond is achieved. The minimizing of stresses is accomplished by the use of a heat activatable liquid pressure-sensitive adhesive material containing a curing agent in conjunction with an activating, cooling, and curing cycle during which the metallic bracket is affixed to the glass surface and secured in position during the adhesive cure.

The activation, cooling, and curing cycle contemplated by this invention for forming an adhesive bond between metal and glass consists of first coating the surface of the metallic article with a heat activatable adhesive composition containing a curing agent, heating the adhesive coated metallic article to activate the adhesive composition, cooling the adhesive coated article to the temperature of the glass surface, affixing the metallic article to the glass surface while the adhesive is in a liquid pressure-sensitive state, and maintaining the metallic article secured in position during the period of time said adhesive is curing.

The compositions contemplated for use in the practice of the method of this invention are heat activatable resin systems designed to yield, on activation and cooling, a liquid pressure-sensitive adhesive. The adhesive compositions contain a quantity of curing agent such that, after activation and cooling, the adhesive remains in a liquid pressure-sensitive state while the coated bracket is being affixed to the glass surface. In addition, the curing agent is present in sufficient amounts such that the adhesive cures, establishing a firm and permanent bond, upon aging. The type and amount of curing agent will vary for various resin systems and the optimum amount for any particular composition will be dependent on the aging time desired as well as the requirement that the adhesive be in a liquid pressure-sensitive state at that point in the method where the bracket is affixed to the windshield.

A fuller understanding of the invention may be had by reference to the following examples when taken in conjunction with the drawing wherein.

For purposes of illustration, an epoxy resin adhesive composition containing an epoxy adduct hardener is described, but it will be readily evident that other types of adhesives might equally as well be used. In the following examples, the adhesive is prepared by stirring in the various components at room temperature.

*Example I*

A satisfactory adhesive for bonding the metallic bracket to a glass surface is prepared by blending 100 parts by weight of the reaction product of bis-phenol A, epichlorohydrin, and dibutylphthalate with 60 parts by weight Thiokol liquid polymer LP-3 (a polymer of bis-(ethylene oxy) methane containing disulfide linkages). The polymer segments of the LP-3 resin are terminated with reactive thiol groups and the average structure of the polymer molecule is:

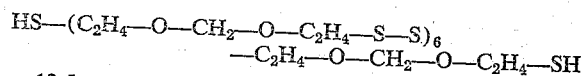

12.5 parts by weight of an adduct type hardener are thoroughly stirred into 100 parts by weight of the above-described resin blend. The adduct type hardener comprises one mol of the reaction product of bis-phenol A and epichlorohydrin reacted with 2 mols of diethylene triamine.

Figure 1:
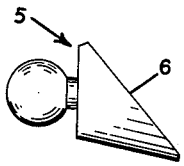
FIGURE 1 illustrates a standard aluminum bracket used for securing rear view mirrors to windshield surfaces.
Figure 2:
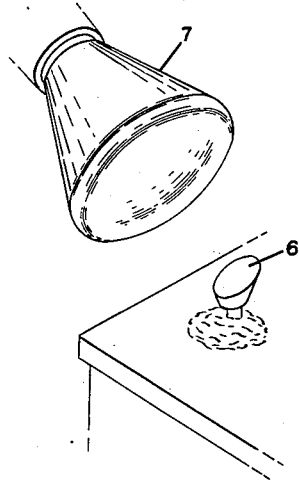
FIGURE 2 illustrates the activation of the adhesive coated bracket using a standard 250-watt infrared lamp.
Figure 3:
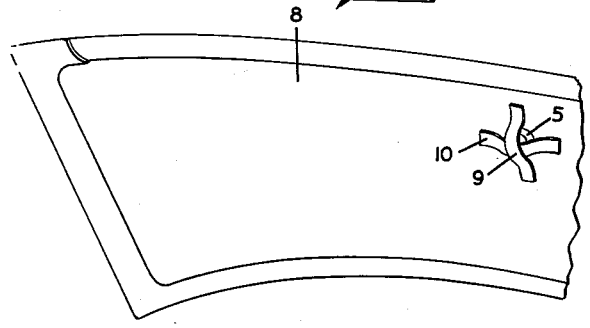
FIGURE 3 shows the bracket secured in position on the windshield during the aging and curing of the adhesive.

Immediately after the adhesive is formulated, a sufficient quantity of adhesive is applied to the surface 6 of the metal bracket 5, illustrated in FIGURE 1, so as to completely coat the bracket surface with a thin layer of adhesive. The coated bracket is then placed, with the adhesive coated surface 6 facing outwardly, as illustrated in FIGURE 2, under a standard 250-watt infrared lamp 7 which is located from 5–6″ from the adhesive coated surface of the bracket and heat is applied to the bracket for approximately two and one-half minutes. The bracket is then removed from the source of heat and allowed to cool to room temperature, about one minute, at which time, while the adhesive is in a pressure-sensitive state, the bracket 5, as illustrated in FIGURE 3, is affixed to the glass surface 8, which is at room temperature, using slight pressure so that excess adhesive is exuded from between the contacting surfaces. Two pieces of tape 9 and 10 are then utilized to secure the bracket in position. At a room temperature of approximately 70° F., the bracket is secured by means of tape to the windshield for a period of about eight hours before installation of the mirror and arm portions of the mirror assembly.

The period of time necessary for securing the bracket in position during the adhesive cure is dependent on the particular adhesive formulation and on the temperature at which it is cured. For example, where installation is made in a cold shop at temperatures less than 65° F., cure times of up to sixteen hours and more must be provided for the epoxy adhesive formulation above described.

By allowing the bracket to cool to room temperature, at which temperature the glass surface, to which it is affixed, is also maintained, stresses realized in the adhesive layer due to the difference in the cooling rate between the glass surface and the metal bracket are minimized and no undue stresses are set up and a firm, permanent adhesive bond is achieved. The timing of the cycle is such that at the end of the cooling period the adhesive is in a pressure-sensitive state and may be easily affixed in any desired position to the glass surface. The adduct hardener continues to cure the adhesive to a thermoset state and at the end of the eight-hour curing period, the adhesive is completely set and is both nonreactive and unaffected by extreme temperature and humidity conditions. Actual tests, wherein attempts have been made to rupture the adhesive bond produced by the method of Example I have resulted in the failure of the glass glazing unit rather than the failure of the adhesive bond between the metal bracket and the glass surface.

The cure cycle is dependent upon the film thickness of the adhesive, the time and temperature to which the metal is heated, and the length of time the bracket is cooled. Utilizing the adhesive formulation set forth in Example I and the sequence of method steps set forth thereunder wherein a very thin, complete coating of adhesive is applied to the bracket and excessive adhesive material is exuded between the surface of the bracket and the glass surface by means of a slight pressure at the time at which the bracket is adhesively affixed to the glass surface, the following schedule using an air circulated type oven results in a pressure-sensitive adhesive at the end of the cooling time at which time the bracket is at the same temperature as the glass surface:

| Temperature at Which Heated and Duration of Heating | | Cooling Time |
| --- | --- | --- |
| 150° F | 10 Minutes | 2–3 Minutes. |
| 180° F | 5 Minutes | 1–2 Minutes. |
| 212° F | 3 Minutes | ½–1 Minute. |

In the adhesive formulation illustrated in Example I, the epoxy resin may be preblended with the Thiokol liquid polymer LP-3 and prepackaged. The adduct hardener must be blended with the preblended resin formulation at the time when the adhesive is utilized in coating the brackets insofar as the adduct hardener will react with the other two resin ingredients to form a thermosetting composition and, therefore, must not be preblended insofar as shelf life of the material would be nil.

Example II

A slightly less reactive epoxy resin adhesive formulation was used in this example to affix a bracket to a windshield using the same sequence of steps recited in Example I. Here the coated bracket was again located approximately 6″ from a 250-watt infrared lamp and heat was applied for approximately three minutes to activate the adhesive. At a room temperature of about 70° F., the bracket was again secured to the windshield for about eight hours prior to mirror assembly.

The adhesive was formulated as described in Example I using 60 parts by weight Thiokol liquid polymer LP-3 and 100 parts by weight of an epoxy resin formed by the reaction of epichlorohydrin with bis-phenol A and having an epoxide equivalent of 210, that is 210 grams of resin contain one gram-mole epoxide oxygen, and an average molecular weight in the range of 350 to 400. To 100 parts by weight of this blend was then added 12.5 parts by weight of an epoxy adduct formed by the reaction product of (1) one mol of the reaction product of epichlorohydrin and bis-phenol A having an epoxide equivalent in the range of 185 to 200 and an average molecular weight in the range of 350 to 400 with (2) two mols of diethylene triamine.

I claim:

In a method of bonding a metal article to the surface of a sheet of glass, the steps comprising coating a surface of the metal article with an adhesive comprised of relative proportions of 100 parts by weight of an epoxy resin formed by the reaction of epichlorohydrin and a bis-phenol, 10 to 100 parts by weight of a polymer having an average structure of the polymer molecule of:

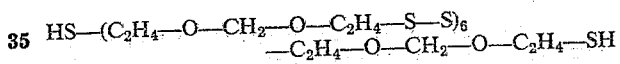

and 2 to 20 parts by weight of an epoxy adduct formed by the reaction of an epoxy resin, said epoxy resin being the reaction product of epichlorohydrin and a bis-phenol, and a polyamine having the formula

where $n$ is 2 or 3; heating said adhesive coated metal to a temperature of from 150 to 300° F. for a period of from one to ten minutes to activate said adhesive; cooling said metal article to substantially the temperature of said sheet of glass, affixing said cooled metal article to said glass surface while said adhesive is in a pressure-sensitive state; and securing said metal article in position during the period of time said adhesive is curing.

References Cited in the file of this patent
UNITED STATES PATENTS

| 2,618,959 | Watkins | Nov. 25, 1952 |
| 2,789,958 | Fettes et al. | Apr. 23, 1957 |
| 2,890,147 | Pearson et al. | June 9, 1959 |
| 2,906,723 | Reese | Sept. 29, 1959 |